(12) United States Patent
Woodcock et al.

(10) Patent No.: US 7,984,615 B2
(45) Date of Patent: Jul. 26, 2011

(54) COMBUSTORS FOR USE IN TURBINE ENGINE ASSEMBLIES

(75) Inventors: Gregory O. Woodcock, Mesa, AZ (US); Ian L. Critchley, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1059 days.

(21) Appl. No.: 11/769,077

(22) Filed: Jun. 27, 2007

(65) Prior Publication Data

US 2009/0003998 A1    Jan. 1, 2009

(51) Int. Cl.
*F02C 1/00* (2006.01)
*F02G 3/00* (2006.01)

(52) U.S. Cl. ......................................... 60/754
(58) Field of Classification Search .............. 60/39.37, 60/752, 754, 755–760
See application file for complete search history.

(56) References Cited

U.S. PATENT DOCUMENTS

| | | | |
|---|---|---|---|
| 3,930,747 A | 1/1976 | Woollenweber | |
| 4,302,940 A | 12/1981 | Meginnis | |
| 4,787,209 A * | 11/1988 | Taylor et al. | 60/757 |
| 5,354,173 A | 10/1994 | Reynolds | |
| 6,101,814 A | 8/2000 | Hoke et al. | |
| 6,711,889 B2 | 3/2004 | Kuo et al. | |
| 6,735,949 B1 | 5/2004 | Haynes et al. | |
| 2004/0200223 A1 | 10/2004 | Nguyen et al. | |
| 2005/0015964 A1 | 1/2005 | Prociw et al. | |
| 2005/0076643 A1 | 4/2005 | Nguyen et al. | |
| 2005/0188698 A1 | 9/2005 | Nguyen et al. | |
| 2005/0204744 A1 | 9/2005 | Schumacher et al. | |
| 2005/0241316 A1 | 11/2005 | Nguyen et al. | |
| 2006/0016199 A1 | 1/2006 | Inoue et al. | |

\* cited by examiner

*Primary Examiner* — Michael Cuff
*Assistant Examiner* — Andrew Nguyen
(74) *Attorney, Agent, or Firm* — Ingrassia Fisher & Lorenz (57) ABSTRACT

An engine assembly includes a scroll assembly including an inlet, an outlet, an inner section, and an outer section. Each of the inner section and the outer section extend between the inlet and the outlet with the outer section being longer than the inner section. The engine assembly further includes a combustor having an entrance for receiving fuel to be mixed with air and combusted in the combustor, an exit coupled to the inlet of the scroll assembly for delivering the combusted air-fuel mixture, including a hot stream, thereto, and a wall coupled between the entrance and the exit and including a plurality of dilution holes therethrough for deflecting the hot stream toward the outer section of the scroll assembly.

15 Claims, 6 Drawing Sheets

COMBUSTORS FOR USE IN TURBINE ENGINE ASSEMBLIES

STATEMENT REGARDING FEDERALLY SPONSORED RESEARCH OR DEVELOPMENT

This invention was made with Government support under contract number DAAE07-96-C-A002 awarded by US Army. The Government has certain rights in this invention.

TECHNICAL FIELD

The present invention generally relates to combustors for use in turbine engine assemblies and more specifically, to combustors for use in turbine engines assemblies having improved temperature characteristics.

BACKGROUND

Gas turbine engine assemblies generally include a combustor in fluid communication with a scroll assembly, which in turn is in fluid communication with a turbine. Typically, the combustor receives pressurized air from a compressor and fuel from a fuel injector. The resulting fuel-air mixture is then ignited in the combustor to produce high temperature combustion gases. The combustion gases then flow downstream into the scroll assembly. The scroll assembly is a hollow, generally coiled component that receives a tangential flow of the hot combustion gases into its interior and exhausts these gases through an annular outlet into an axial inflow turbine situated adjacent to the scroll, or a radial inflow turbine situated at its center.

The extreme temperature environment resulting from the hot combustion gases may limit the useful operating time, and ultimately, component life of the engine assembly. Particularly, the turbine can be very sensitive to variations and extremes in temperature. This consideration is complicated by the asymmetrical nature of the scroll assembly and the non-uniform temperatures of the gases exiting from the combustor. As the combustion gases flow through the scroll assembly, mixing occurs with between hotter and cooler gases, with cooling of the relatively hotter gas. However, portions of the combustion gases, particularly hot streams in the combustion gases, may exit the scroll assembly before sufficient mixing and cooling has occurred.

Accordingly, it is desirable to provide turbine engine assemblies having combustors that provide improved temperature characteristics. In addition, it is desirable to provide combustors that provide combusted gases that have advantageous temperature profiles to a scroll assembly for a turbine. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, an engine assembly includes a scroll assembly including an inlet, an outlet, an inner section, and an outer section. Each of the inner section and the outer section extend between the inlet and the outlet with the outer section being longer than the inner section. The engine assembly further includes a combustor having an entrance for receiving fuel to be mixed with air and combusted in the combustor, an exit coupled to the inlet of the scroll assembly for delivering the combusted air-fuel mixture, including a hot stream, thereto, and a wall coupled between the entrance and the exit and including a plurality of dilution holes therethrough for deflecting the hot stream toward the outer section of the scroll assembly.

In another exemplary embodiment, an engine assembly includes a scroll assembly including an inlet, an outlet, an inner section, and an outer section, each of the inner section and the outer section extending between the inlet and the outlet, the outer section being longer than the inner section. The engine assembly further includes a combustor having an entrance for receiving fuel to be mixed with air and combusted in the combustor, an exit coupled to the inlet of the scroll assembly for delivering the combusted air-fuel mixture, including a hot stream, thereto, and a wall coupled between the entrance and the exit and including a plurality of dilution holes therethrough for deflecting the hot stream toward the outer section of the scroll assembly. The engine assembly also includes a turbine coupled to the outlet of the scroll assembly.

In yet another exemplary embodiment, a can combustor includes an entrance for receiving fuel to be mixed with air and combusted in the combustor, an exit coupled to the inlet of the scroll assembly for delivering the combusted air-fuel mixture, including a hot stream, thereto, and a cylindrical wall coupled between the entrance and the exit. The cylindrical wall further includes a plurality of primary holes and a plurality of dilution holes downstream of the plurality of primary holes. The plurality of dilution holes includes at least one first dilution hole and at least one second dilution hole arranged on opposite sides of the cylindrical wall, and the at least one first dilution hole defines a larger area than the at least one second dilution hole.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the application and uses of exemplary embodiments. Furthermore, there is no intention to be bound by any theory presented in the preceding background or the following detailed description.

Figure 1:
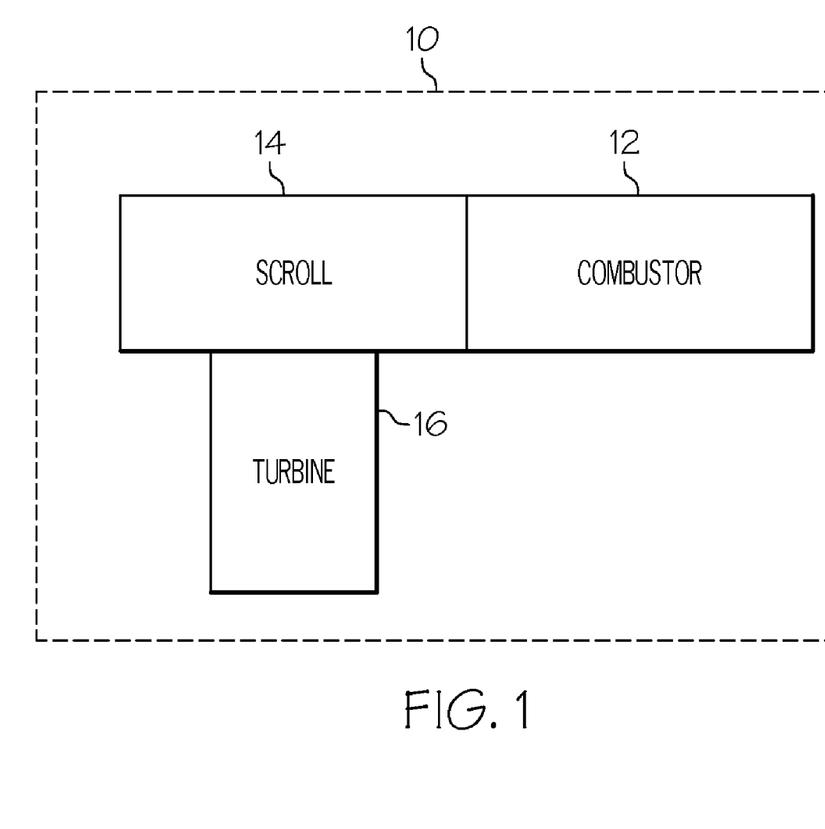
FIG. 1 is a schematic representation of a turbine engine assembly in accordance with an exemplary embodiment.

FIG. 1 is a schematic representation of a turbine engine assembly 10 in accordance with an exemplary embodiment. The turbine engine assembly 10 includes a combustor 12, a scroll assembly 14, and a turbine 16. The scroll assembly 14 is coupled between the combustor 12 to the turbine 16. The combustor 12 receives compressed air from a compressor (not shown) and fuel from a fuel injector (not shown). The resulting fuel-air mixture is ignited by an igniter (not shown) to produce high energy combustion gases. As will be discussed in further detail below, the combustor provides the combustion gases to the scroll assembly 14. The scroll assembly 14 then provides the combustion gases to the turbine 16 for energy extraction. The scroll assembly 14 serves to condition and mix, and as a result, cool the combustion gases to be received by the turbine 16. As such, the scroll assembly 14 distributes the combustor gases from a simple cylindrical flow channel to an annular axial flow channel, or in an alternate embodiment, a radially inward flow channel between parallel plates.

Figure 2:
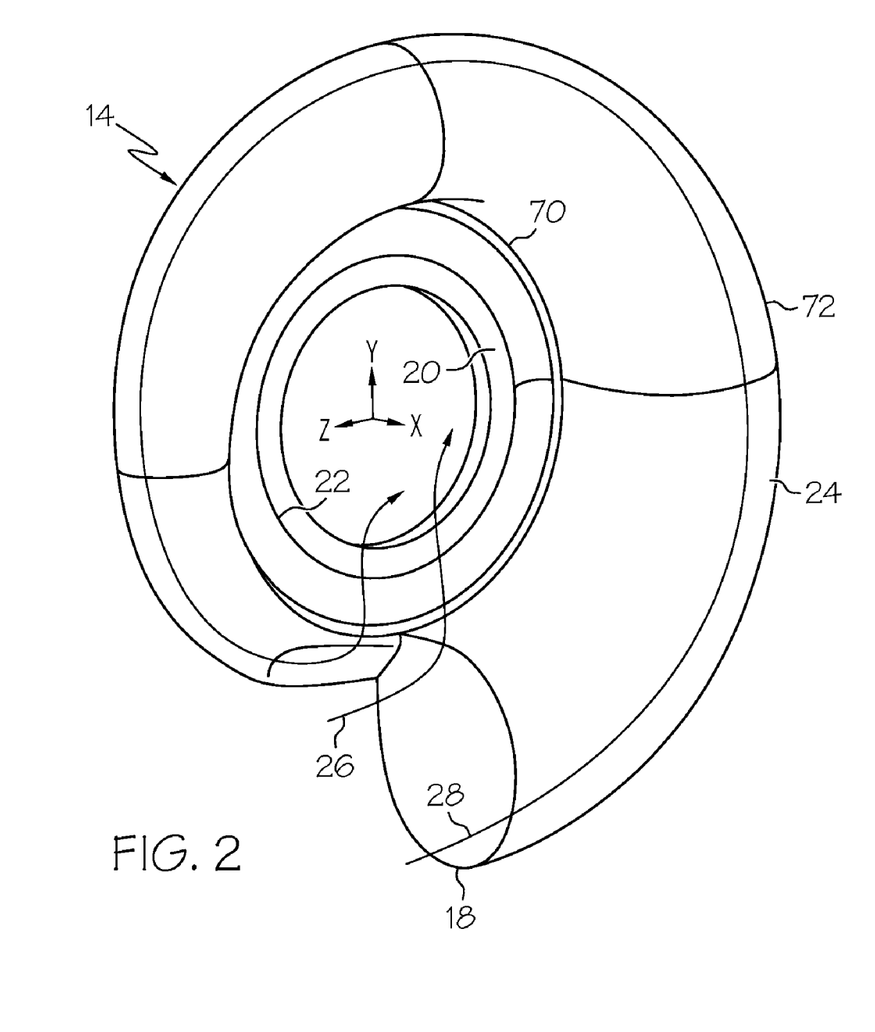
FIG. 2 is a side view of a scroll assembly of the turbine engine assembly of FIG. 1 in accordance with the exemplary embodiment.

FIG. 2 is a side view of a scroll assembly 14. The scroll assembly 14 has a spiral or coil-shaped contour. The scroll assembly 14 has an inlet 18 that receives the combustion gases from the combustor 12 (FIG. 1) and an annular outlet 20. In the view of FIG. 2, the scroll assembly 14 is generally arranged in an yz-plane and the combustion gases exit the annular outlet 20 in the x-direction. The turbine 16 (FIG. 1) is attached to the scroll assembly 14 at the annular outlet 20 in the illustrated embodiment to receive the combustion gases. In alternate embodiments, the scroll assembly may exit in the radially inward direction to supply a radial turbine.

Due to its geometry, the scroll assembly 14 can be considered to have an inner section 70 and an outer section 72 in the interior volume of the scroll assembly 14. The inner and outer sections 70, 72 have a first circumference 22 and a second circumference 24, respectively. Due to the scrolled nature of the scroll assembly 14, the outer section 72 is longer than the inner section 70. Air entering the scroll assembly 14 forms an infinite number of flow paths. Two exemplary flow paths 26, 28 are illustrated. As the flow paths (e.g., 26, 28) travel through the scroll assembly 14, they begin to continually exit through the annular outlet 20. Flow paths such as the flow path 26 are closer to the inner section 70, while flow paths such as the flow path 28 are closer to the outer section 72. Since the inner section 70 is closer to the annular outlet 20, flow paths such as the flow path 26 tend to exit the scroll assembly 14 sooner than the flow paths such as the flow path 28, as shown in FIG. 2.

The scroll assembly 14 may be constructed of any material suitable for high temperature combustible systems. Thin sheet metal capable of withstanding high temperatures may be used to fabricate the scroll assembly 14 through a forming process and machined rings (not shown) may be welded to the sheet metal to form specified interface characteristics and for structural reinforcement. Examples of suitable materials are nickel alloys, such as Haynes 230 or Hastelloy X.

Figure 3:
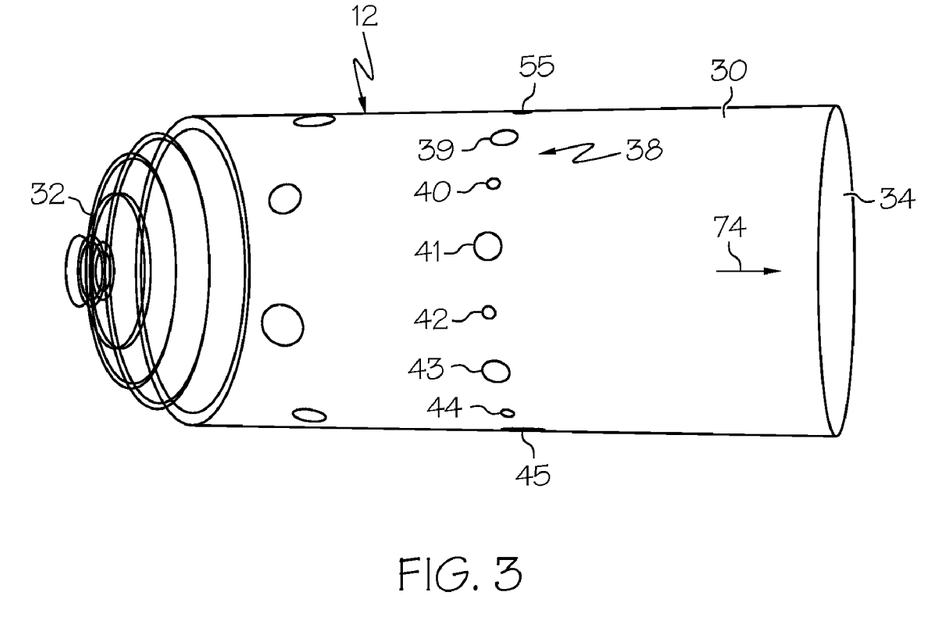
FIG. 3 is a first side view of a combustor of the turbine engine assembly of FIG. 1 in accordance with the exemplary embodiment.
Figure 4:
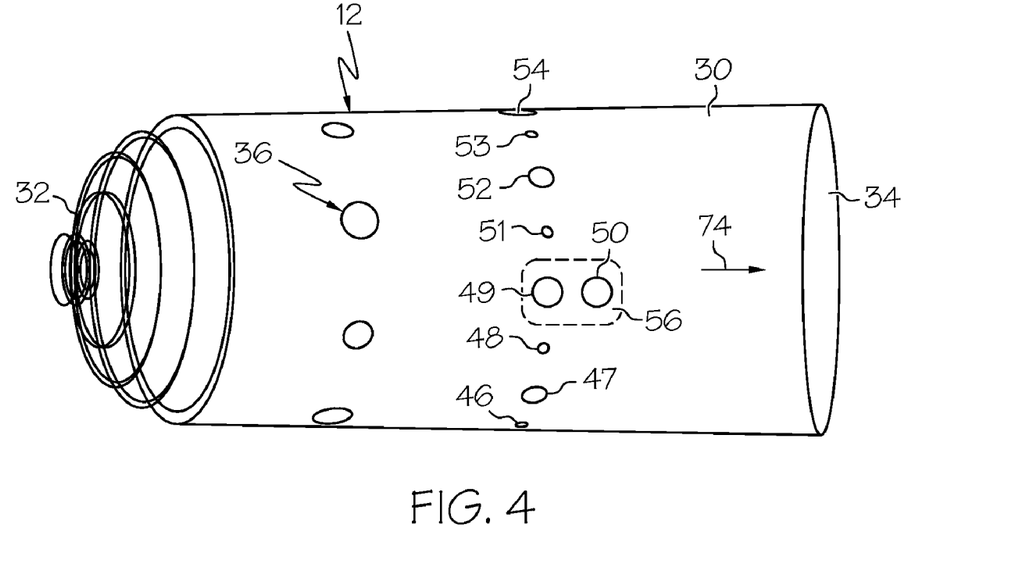
FIG. 4 is a second side view of the combustor of FIG. 3 in accordance with the exemplary embodiment.
Figure 5:
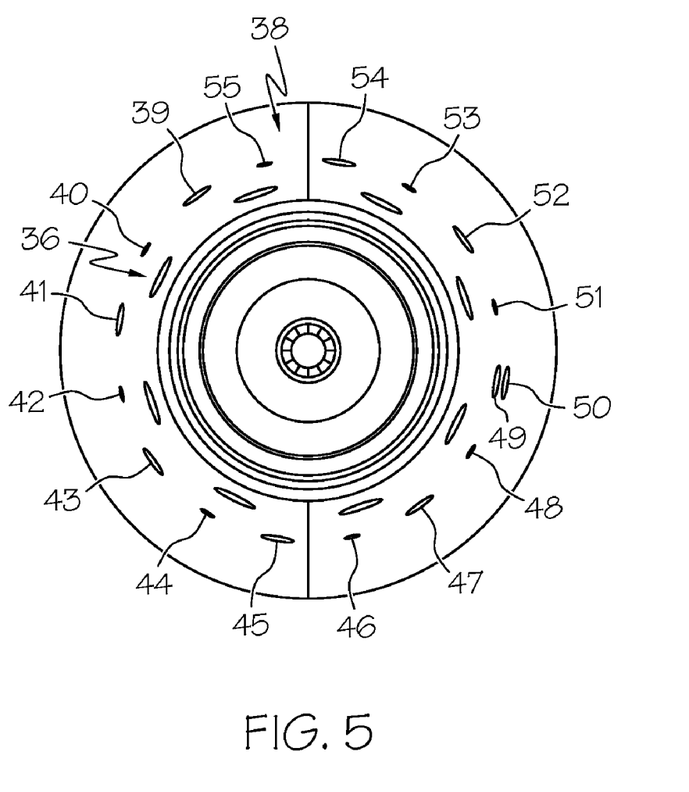
FIG. 5 is an end view of the combustor of FIGS. 3 and 4 in accordance with the exemplary embodiment.

FIG. 3 is a first side view of a combustor 12 of the turbine engine of FIG. 1, and FIG. 4 is a second side view of the combustor 12 of the turbine engine of FIG. 1. Additional details of the combustor 12 are shown in FIG. 5, which is an end view of the combustor 12. Referring to FIGS. 3-5, the combustor 12 is a can combustor in this exemplary embodiment. The combustor 12 has a cylindrical wall 30 with an entrance 32 for admitting the air-fuel mixture and an exit 34 that is coupled to the inlet 18 of the scroll assembly (see, e.g., FIGS. 1 and 2). The combustor 12 has a length of, for example, 14.5 inches, although other sizes can be provided. As the air-fuel mixture is combusted, the combustion gases move downstream, as indicated by arrow 74.

The combustor 12 includes a plurality of primary holes 36 that admit additional air into the combustor 12. Although eight primary holes 36 are illustrated, a greater or fewer number of primary holes 36 can be provided in alternate embodiments. Moreover, other diameters and even differing diameters can be provided. Typically, the primary holes 36 have a round cross-section, although other shapes such as oval, egg-shaped, or tapered may also be utilized.

The combustor 12 also includes a plurality of dilution holes 38, which are individually indicated by reference numbers 39-55 and function to admit additional air into the combustor 12. In this embodiment, the dilution holes 38 are equally spaced along the circumference of the combustor 12. The dilution holes 38 can vary in size. In this embodiment, the dilution holes 38 circumferentially alternate between relatively larger holes (e.g., 39, 41, 43, 45, 47, 49, 50, 52, 54) and relatively smaller holes (e.g., 40, 42, 44, 46, 48, 51, 53, 55). The dilution holes 38 can have a diameter that varies between 0.1 inches or smaller and 2 inches or larger. In one embodiment, the dilution holes 40, 42, 44, 46, 48, 51, 53, 55 have a diameter of about 0.26 inches. The dilution holes 39, 51, 43, 47, 52 have a diameter of about 0.58 inches. The dilution holes 45, 54 have a diameter of about 0.812 inches. The dilution holes 49, 50 have a diameter of about 0.69 inches.

Most of the dilution holes 39-49, 51-55 are located at a length of about 53% of the length of the combustor 12. However, the dilution hole 50 is located at a length of about 61% of the length of the combustor 12 adjacent and downstream to the dilution hole 49. In other embodiments, the dilution hole 50 can be upstream of the dilution hole 49 or immediately circumferentially adjacent to the dilution hole 49. As will be discussed in further detail below in reference to FIG. 6, the paired dilution holes 49, 50 enable the air jets flowing there through to penetrate the combustor 12 at a greater radial length than would be otherwise possible with just one of the paired dilution holes 49, 50. This is particularly true when considering the dilution hole 41 positioned circumferentially opposite, i.e., at 180° from, the paired dilution holes 49, 50. Although the dilution hole 41 in the illustrated exemplary embodiment is 180° opposite the paired dilution holes 49, 50, it can be appreciated that other embodiments may have the dilution hole 41 only approximately opposite the paired dilution holes 49, 50. The area of dilution hole 41 is generally smaller than the individual and/or combined areas of the paired dilution holes 49, 50. In an alternate embodiment, the paired dilution holes 49, 50 can be replaced by a single dilution hole 56, as indicated by the dashed outline in FIG. 4. In further exemplary embodiments, the dilution holes 39-55 can be replaced by any asymmetrical pattern than enables air jets on one side to penetrate further than the air jets from an opposite side. Typically, the dilution holes 38 have a round cross-section, although other shapes such as oval, egg-shaped, or tapered may also be utilized. Although not shown, effusion holes, or cooling louvers, may also be provided to provide cooling air flow to the wall 30 of the combustor 12.

Figure 6:
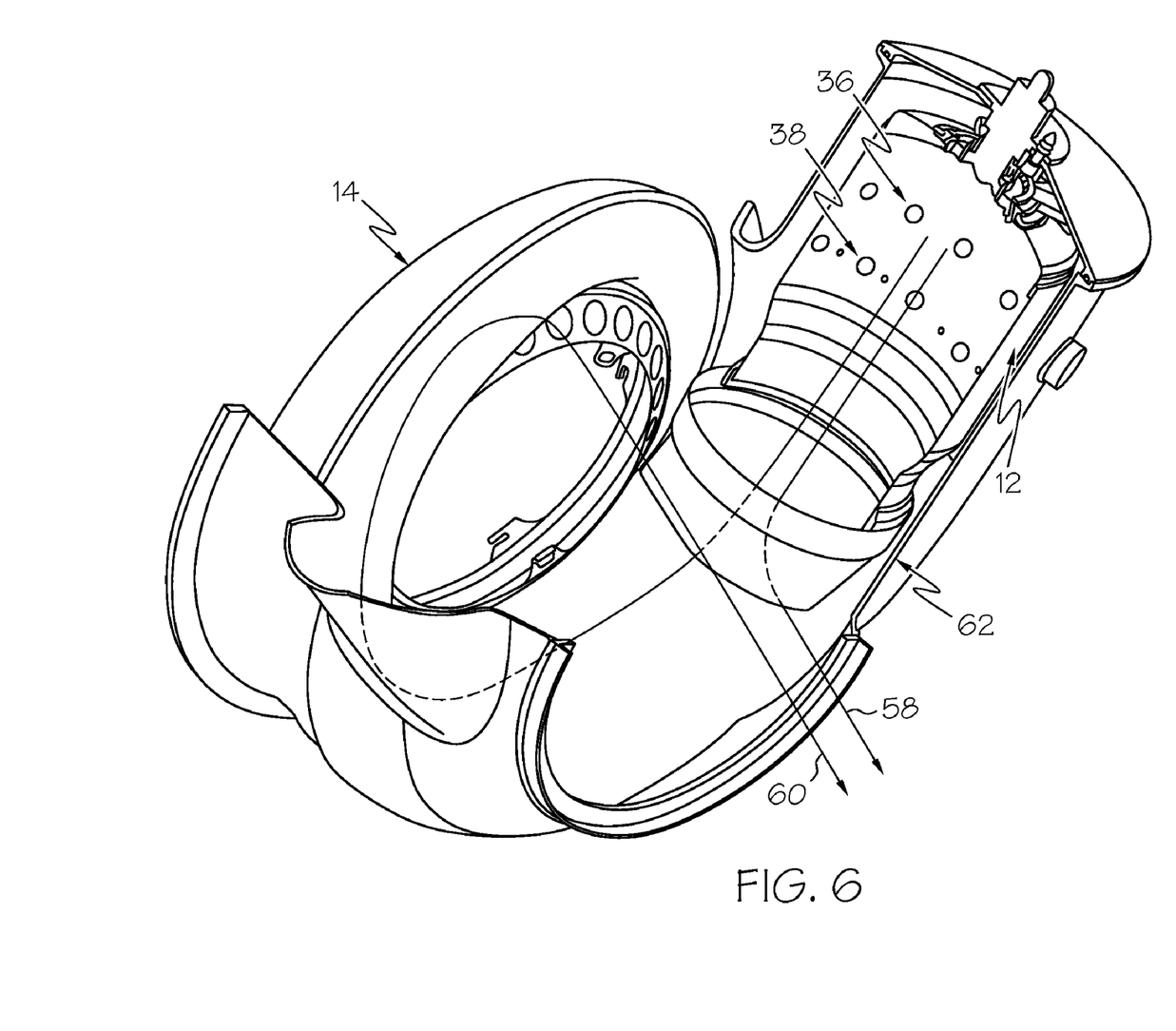
FIG. 6 is a partial cut-away view of the combustor and scroll assembly of FIGS. 2-5 in accordance with the exemplary embodiment.

FIG. 6 is a partial cut-away view of the combustor 12 coupled to the scroll assembly of FIGS. 2-5 to better illustrate aspects of exemplary embodiments. As noted above, the scroll assembly 14 serves to condition and mix, and as a result, cool the relatively hotter combustion gases to be received by the turbine 16. Like FIG. 2, FIG. 6 illustrates two flow paths 58, 60. The first flow path 58 is closer to the inner section (e.g., 70 best shown in FIG. 2) of the scroll assembly 14, and the second flow path 60 is closer to the outer section (e.g., 72, best shown in FIG. 2) of the scroll assembly 14. A combustor housing 62 can also be provided.

Figure 7:
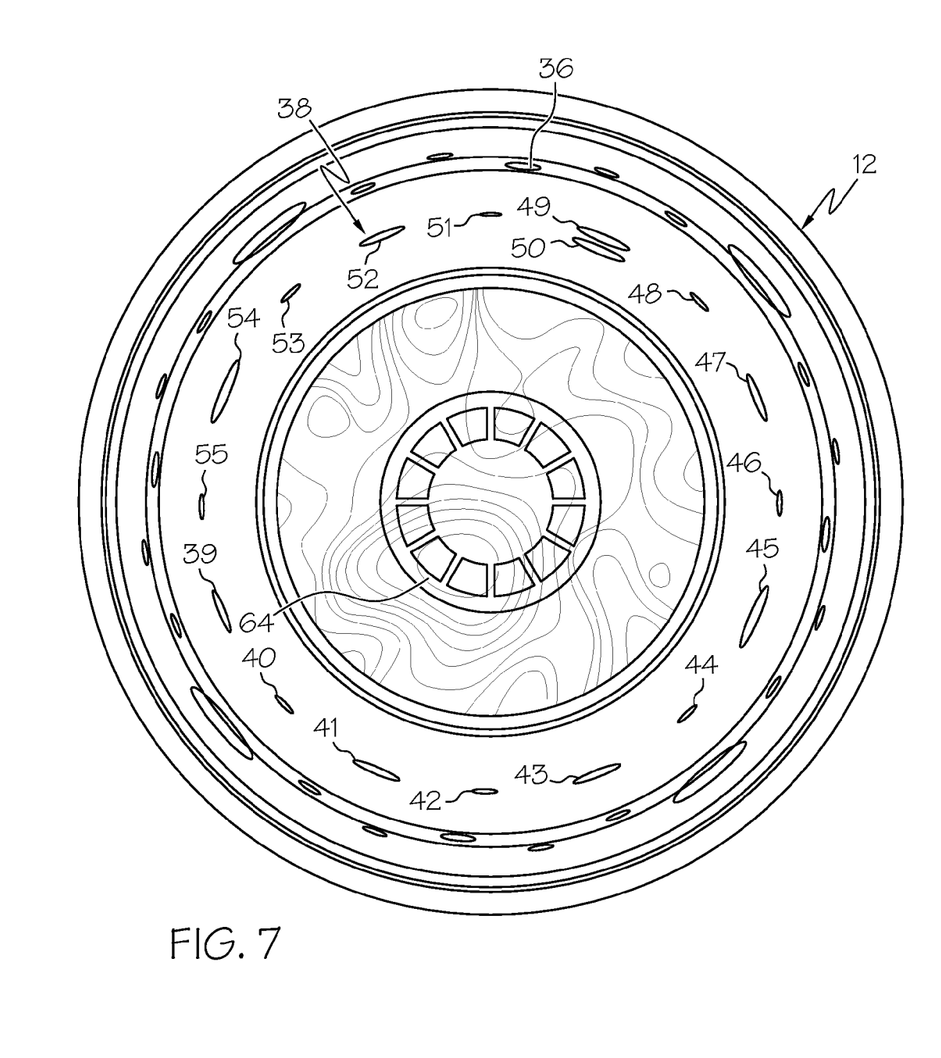
FIG. 7 is a graphical representation of a temperature distribution of the combustion gases exiting the combustor of FIGS. 3-5 in accordance with the exemplary embodiment.

FIG. 7 is a temperature distribution of the combustion gases exiting the combustor of FIGS. 3-5 in accordance with an exemplary embodiment. During combustion, the temperature of the combustion gases tends to vary across a radial cross-section, such as that shown in FIG. 7. The hottest combustion gases are referred to as a "hot stream" and indicated in FIG. 7 by reference numeral 64. In conventional engine assemblies, the hot streams tend to be in the center of the combustor. However, in these conventional engine assemblies, when a centered hot stream enters a scroll assembly, portions or all of the hot stream may exit the scroll assembly before sufficient mixing and cooling has occurred.

In accordance with an exemplary embodiment, the hot stream 64 is directed off-center before exiting the combustor 12 by the dilution holes 38. Particularly, this is accomplished by the asymmetrical nature of the dilution holes 38, such as paired dilution holes 49, 50. The air jets emanating from the paired dilution holes 49, 50 are larger than the corresponding air jets emanating from the dilution hole 41 on the opposite side of the combustor 12. As such, the air jets from the paired dilution holes 49, 50 push the hot stream 64 toward the opposite side of the combustor 12.

In this embodiment, the paired dilution holes 49, 50 are adjacent to the inner section 70 of the scroll assembly 14 (FIG. 2), and the dilution hole 41 opposite the paired dilution holes 49, 50 is adjacent to the outer section 72 of the scroll assembly 14 (FIG. 2). As a result, the hot stream 64 is pushed away from the shorter, inner section 70 (FIG. 2) and towards the longer, outer section 72 of the scroll assembly 14 (FIG. 2). As noted above, flow paths closer to the inner section 70 tend to exit the scroll assembly 14 sooner than the flow paths closer to the outer section 72 such as the flow path 28, as shown in FIG. 2. As such, the paired dilution holes 49, 50 serve to push the hot stream 64 into an area in which it is less likely to exit the scroll assembly 14 prematurely at too high of temperatures. As the hot stream 64 follows the path adjacent the outer section 72 of the scroll assembly 14 (FIG. 2), the hot stream 64 is cooled by mixing with adjacent cooler exhaust, thereby resulting in reduced temperatures. As shown in FIG. 7, the air jets from the paired dilution holes 49, 50 push the hot stream of 2000° K from the center of the combustor 12. As a result, the cooler air of approximately 1460-1730° K follows the scroll assembly 14 proximate to the first diameter 22 (FIG. 2), and thus, the shorter path to the turbine. This results in a lower peak temperature of combustion gases exiting the scroll assembly 14. The lower peak temperature at the inlet of the turbine 16 results in improved durability. An alternate asymmetric configuration would employ a single or multiple orifices to create a strong jet, while at 180 degrees to the strong jet would be no orifice. Instead, centered about the opposing location would be multiple smaller orifices to create multiple weak jets.

Although the combustor 12 illustrated herein is a single can combustor, aspects of the present invention are also applicable to other types of combustors, such as multi-can and can-annular arrangements. Engine assemblies of the present invention can be utilized in gas turbine applications such as aircraft propulsion, land-based vehicle propulsion, marine based propulsion, auxiliary power units and power generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine assembly, comprising:
    a scroll assembly including an inlet, an outlet, an inner section, and an outer section, each of the inner section and the outer section extending between the inlet and the outlet, the outer section being longer than the inner section; and
    a combustor comprising
    an entrance for receiving fuel to be mixed with air and combusted in the combustor,
    an exit coupled to the inlet of the scroll assembly for delivering the combusted air-fuel mixture, including a hot stream, thereto, and
    a wall coupled between the entrance and the exit and including a plurality of dilution holes therethrough for deflecting the hot stream toward the outer section of the scroll assembly,
    wherein the plurality of dilution holes includes at least one first dilution hole adjacent the inner section of the scroll assembly and at least one second dilution hole adjacent the outer section of the scroll assembly, and wherein the at least one first dilution hole has a first hole area and the at least one second dilution hole has a second hole area, and wherein the first area is greater than the second area.

2. The engine assembly of claim 1, wherein the at least one first dilution hole is a single hole and the at least one second dilution hole is a single hole.

3. The engine assembly of claim 1, wherein the at least one first dilution hole is two holes and the at least one second dilution hole is a single hole.

4. The engine assembly of claim 1, wherein the at least one first dilution hole includes two holes with one of the two holes positioned downstream from the other.

5. The engine assembly of claim 1, wherein the at least one first dilution hole is on an opposite side of the wall portion as the at least one second dilution hole.

6. The engine assembly of claim 1, wherein the at least one first dilution hole is circumferentially offset to the at least one second dilution hole at 180°.

7. The engine assembly of claim 1, wherein the combustor is a can combustor.

8. An engine assembly, comprising:
    a scroll assembly including an inlet, an outlet, an inner section, and an outer section, each of the inner section and the outer section extending between the inlet and the outlet, the outer section being longer than the inner section;
    a combustor comprising
    an entrance for receiving fuel to be mixed with air and combusted in the combustor,
    an exit coupled to the inlet of the scroll assembly for delivering the combusted air-fuel mixture, including a hot stream, thereto, and
    a wall coupled between the entrance and the exit and including a plurality of dilution holes therethrough for deflecting the hot stream toward the outer section of the scroll assembly; and
    a turbine coupled to the outlet of the scroll assembly, wherein the plurality of dilution holes includes at least one first dilution hole adjacent the inner section of the scroll assembly and at least one second dilution hole adjacent with the outer section of the scroll assembly, wherein the at least one first dilution hole has a first hole area and the at least one second dilution hole has a second hole area, and wherein the first area is greater than the second area.

9. The engine assembly of claim 8, wherein the plurality of dilution holes are arranged in a circumferentially asymmetrical pattern.

10. The engine assembly of claim 8, wherein the at least one first dilution hole is a single hole and the at least one second dilution hole is a single hole.

11. The engine assembly of claim 8, wherein the at least one first dilution hole is two holes and the at least one second dilution hole is a single hole.

12. The engine assembly of claim 8, wherein the at least one first dilution hole includes two holes with one of the two holes positioned downstream from the other.

13. The engine assembly of claim 8, wherein the at least one first dilution hole is on an opposite side of the wall portion as the at least one second dilution hole.

14. The engine assembly of claim 8, wherein the at least one first dilution hole is circumferentially offset to the at least one second dilution hole at 180°.

15. The engine assembly of claim 8, wherein the combustor is a can combustor.

\* \* \* \* \*